(No Model.)

J. F. SWINNERTON.
ROLLER BEARING.

No. 584,904. Patented June 22, 1897.

Witnesses
H. C. Alexander.
E. E. Vernell.

Inventor
James F. Swinnerton
By Attorneys
Fowler & Fowler

UNITED STATES PATENT OFFICE.

JAMES F. SWINNERTON, OF ST. LOUIS, MISSOURI.

ROLLER-BEARING.

SPECIFICATION forming part of Letters Patent No. 584,904, dated June 22, 1897.

Application filed September 3, 1896. Serial No. 604,701. (No model.)

*To all whom it may concern:*

Be it known that I, JAMES F. SWINNERTON, a citizen of the United States, residing at the city of St. Louis, in the State of Missouri, have invented certain new and useful Improvements in Roller-Bearings, of which the following is such a full, clear, and exact description as will enable any one skilled in the art to which it appertains to make and use the same, reference being had to the accompanying drawings, forming part of this specification.

The objects of my invention are to provide an antifriction-bearing in which the weight is distributed over a large amount of surface, thus obviating the necessity of making the parts extremely hard, to do away with the necessity of adjusting the parts, and to make the bearings dust-proof without danger of bringing the metal parts of the bearing into sliding contact.

My invention consists in the various novel features and details of construction set forth in the following specification, and pointed out in the claims affixed hereto.

Figure 1:
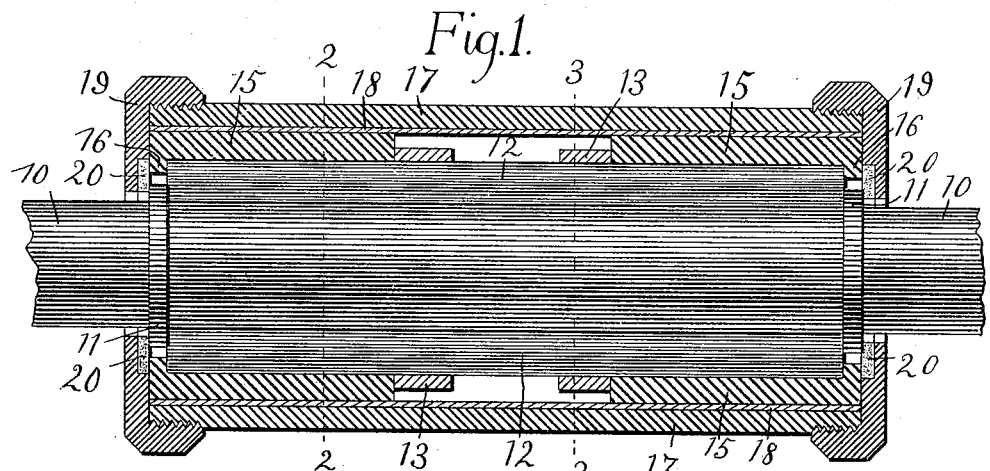
Figure 2:
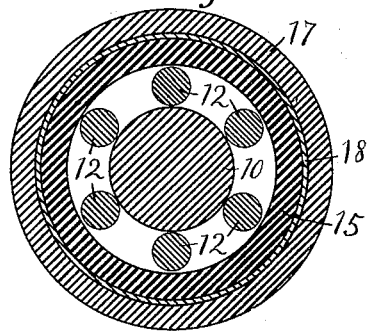
Figure 3:
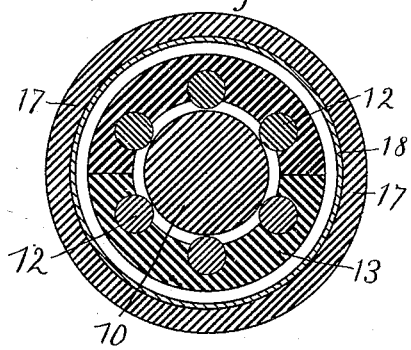
Figure 4:
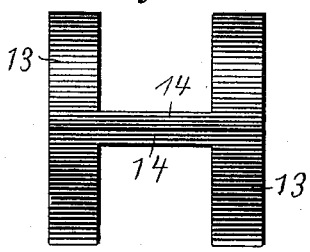
Figure 5:
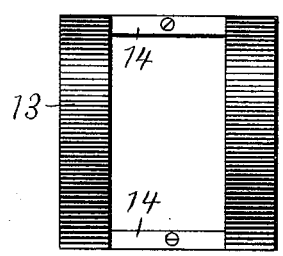

In the accompanying drawings, which illustrate one form of bearing made in accordance with my invention, Figure 1 is a longitudinal section. Fig. 2 is a section on the line 2 2 of Fig. 1. Fig. 3 is a section on the line 3 3 of Fig. 1, and Figs. 4 and 5 are views of details.

Like marks of reference refer to similar parts in the several views of the drawings.

10 is the axle or shaft, on which are two flanges 11, Fig. 1. The flanges 11 are preferably formed integral with the axle 10, but, if so desired, may be made separate and secured to the axle in any suitable way. Situated around the axle 10 and between the collars 11 are a number of rollers 12, which are held in position around the axle 10, some distance apart and parallel to each other, by a roller-cage 13. The roller-cage 13 is preferably about one-third the length of the rollers 12, and is formed in one piece or may be formed in two parts, which are secured together by screws or in any other suitable manner. The central portion of each half of the roller-cage 13 is cut away when made in halves, leaving only a thin connecting-strip 14 at each side, so that only a small portion at each end of the cage comes in contact with the rollers. The interior of the cage 13 is made larger than the axle 10, as shown in Fig. 3, so as not to come in contact with the same and pass readily over the collars 11 when made in one piece.

Surrounding each end of the rollers 12 and preferably extending about one-third of the length of the same is a roller-thimble 15, provided with an inwardly-extending flange 16. Surrounding the roller-thimble 15 is the outer shell or casing 17. Between the thimbles 15 and the shell 17 is a sheet-metal cylinder 18. The cylinder 18 is especially adapted for use in the crank-shaft bearing of a bicycle, its object being to prevent borax, brazings, or filings from entering the bearing, and may be dispensed with when no brazing is to be done on the shell. At each end of the shell 17 is a screw-cap 19, the opening in which for the passage of the axle 10 is a little larger than the collars 11 on said axle, so as not to come in contact with the same. Each of the screw-caps 19 is provided with a washer 20, of felt or other similar yielding material, which bears against the collar 11 and thus renders the bearing dust-proof without causing any appreciable amount of friction.

As the rollers 12 come in contact with the axle 10 throughout their entire length and with the roller-thimbles 15 two-thirds of their length the weight is distributed over a large area and consequently the parts of the bearing can be made comparatively soft, thus reducing their cost. The roller-cage 13, by holding the rollers out of contact with each other, prevents friction between them. The spaces between the rollers also serve as receptacles for a large amount of oil or other lubricant, so that the bearing does not require frequent oiling. As there is no weight on the roller-cage 13 there is no appreciable amount of friction between it and the rollers.

While I have shown and described my bearing in the form particularly adapted for the crank-shaft of a bicycle, it is obvious that it can be used in any place where an antifriction-bearing is desired, and that it is immaterial whether the axle or the casing is the fixed part.

Having fully described my invention, what I claim as new, and desire to secure by Letters Patent of the United States, is—

1. In an antifriction-bearing, a suitable casing, removable roller-thimbles in each end of said casing, end caps for said casing secured to the casing and holding said roller-thimbles in place, an axle or shaft provided with flanges, antifriction-rollers around said axle or shaft and between said flanges, and a roller-cage between said roller-thimbles and holding said rollers out of contact.

2. In an antifriction-bearing, a shaft or axle provided with flanges, rollers situated around said axle and between said flanges, roller-thimbles at each end of said rollers, a shell or casing carrying said roller-thimbles, end caps for said shell or casing, washers of felt or other compressible material carried by said end caps and making contact with said flanges, and a roller-cage holding said rollers parallel and out of contact with each other.

In testimony whereof I have hereunto set my hand and affixed my seal in the presence of the two subscribing witnesses.

JAMES F. SWINNERTON. [L. S.]

Witnesses:
D. W. CARNES,
J. D. ESTES.